United States Patent
Jansen et al.

[15] 3,696,125
[45] Oct. 3, 1972

[54] PROCESS FOR THE PRODUCTION OF SALTS OF 5-FORMYL-FURAN-2-SULPHONIC ACID

[72] Inventors: Gert Jansen, Farum; Niels Clauson-Kaas, Horsholm, both of Denmark

[73] Assignee: Ciba-Geigy Corporation, Ardsley, N.Y.

[22] Filed: Oct. 16, 1970

[21] Appl. No.: 81,586

Related U.S. Application Data

[63] Continuation-in-part of Ser. No. 56,651, July 20, 1970, abandoned.

[52] U.S. Cl. ............... 260/347.2, 260/152, 260/154
[51] Int. Cl. ............................................ C07d 5/14

[58] Field of Search.................................260/347.2

[56] References Cited

OTHER PUBLICATIONS

Ivanov et al. Chem. Abstr. (1963) 4495d

Primary Examiner—Alex Mazel
Assistant Examiner—Bernard Dentz
Attorney—Karl F. Jorda and Nestor W. Shust

[57] ABSTRACT

Salts of 5-formyl-furan-2-sulphonic acid are produced by a new process by reacting cis-oxoglutaconaldehyde or an acetal thereof with an alkali metal hydrogen sulphite.

8 Claims, No Drawings

PROCESS FOR THE PRODUCTION OF SALTS OF 5-FORMYL-FURAN-2-SULPHONIC ACID

CROSS-REFERENCE

This is a continuation-in-part of the co-pending application, Ser. No. 56,651, filed July 20, 1970, now abandoned.

DESCRIPTION OF THE INVENTION

The present invention relates to a new and improved process for the production of salts of 5-formyl-furan-2-sulphonic acid.

Surprisingly, it has been found that the known alkali salts of 5-formyl-furan-2-sulphonic acid (Ch. Ivanov and co-workers: Godishnik Khim.-Tekhnol. Inst., 231 (1960); CA. 58. 4495 d (1963)) can be produced from easily accessible starting materials by reacting cis-oxoglutaconaldehyde, the monomethyl, monoethyl, mono-n-propyl, dimethyl, diethyl or di-n-propyl acetal thereof with an alkali metal hydrogen sulphite in an aqueous or an aqueous-alcoholic solution. The reaction is preferably performed at a pH-value of between 0.5 and 5.0, and at a temperature between 0° C and the boiling point of the solution. The alkali metal hydrogen sulphite and the cis-oxoglutaconaldehyde or its acetal as defined are advantageously employed in a molar ratio of from 1:1 to 2:1.

Water is a good reaction medium; for the purpose of improving the filterability and color of the end product, it may, however, be advisable, to use a mixture of water and a water-miscible or readily water-soluble alcohol such as, e.g. mixtures of water and methanol, ethanol, propanol, isopropanol, tertiary butanol, methoxyethanol, ethoxyethanol or n-butoxyethanol. Of these alcohols methanol is preferred. Generally, however, the reaction is carried out mainly in an aqueous solution.

Sodium hydrogen sulphite is preferably used as an alkali metal hydrogen sulphite, but potassium hydrogen sulphite can also be used.

The pH-value desired at any phase of the reaction sequence according to the invention, where the pH-value is not already established in a suitable manner by the reactants and reaction products, can be attained by the addition of compounds giving an acid reaction. Suitable compounds are, e.g. hydrochloric acid or sulphuric acid.

According to a first preferred embodiment the reaction temperature is firstly maintained between 0° C and 50° C during 5 minutes to 4 hours, and then raised to between 50° C and the boiling temperature. According to a second and third preferred aspect of the invention the reaction is firstly carried out at a pH-value of between 2.0 and 3.0 and at a temperature of between 0° C and 16° C for about 30 minutes, and subsequently at about 60° C for 60 minutes and at a pH-value of between 2.0 and 1.0, or the reaction is firstly performed at a pH-value of 2.5 and at a temperature of 10° C for 30 minutes, and subsequently at a pH-value of 1.5 and at a temperature of 60° C for 60 minutes.

The cis-oxoglutaconaldehyde, used as starting material in the process according to this invention can be produced in a known simple manner by allowing to act on furfural, in an aqueous medium and at a pH-value below 6, possibly with the addition of catalysts, the single to 1.5-fold molar amount of chlorine, or a corresponding amount of a substance releasing chlorine.

The salts of 5-formyl-furan-2-sulphonic acid are made easily accessible by the process according to the invention, so that, from a commercial aspect, they can now be considered as constituting excellent starting materials for the production of valuable organic compounds, e.g. formazan dyestuffs.

If it should be advantageous, with regard to further processing, to use the free 5-formyl-furan-2-sulphonic acid instead of its salts, then said salts are converted by known methods into the free acid, e.g. by acidification with sulphuric acid or with another strong mineral acid, or by treatment with an ion-exchanger.

The new process is illustrated by the following examples, but these in no way limit the scope of the invention. The temperatures are given in degrees Centigrade.

EXAMPLE 1

An amount of 10.4 g (0.100 mole) of sodium hydrogen sulphite is added all at once, at 0° to 100 ml of a one-day old, single-molar, aqueous solution of cis-oxoglutaconaldehyde having a pH-value of 2.0. The mixture is stirred for 30 minutes at room temperature. All the sodium hydrogen sulphite is dissolved during the first minute.

After 30 minutes, the clear, slightly yellow reaction mixture is heated to 60° during a period of 30 minutes. The temperature of 60° is then maintained for a further 60 minutes. The obtained suspension is cooled to 15° and the crystals are then removed by filtration. The pH-value of the mother liquor is 1.0. The moist filter cake is washed on the filter, firstly with 20 ml of a mixture of ethanol and water in the ratio of 1:1, then with 20 ml of ethanol, and finally with 20 ml of ether. After drying in air, 11.2 g (50 percent of the theoretical value) of a sesqui hydrate of the sodium salt of 5-formyl-furan-2-sulphonic acid are obtained. The melting point is above 250° (with decomposition).

Instead of sodium hydrogen sulphite, the equivalent amount of potassium hydrogen sulphite can be used to produce the corresponding potassium salt.

The starting product, namely cis-oxoglutaconaldehyde (cp., e.g. G. Brammer Petersen and co-workers, Klg. Danske Videnskab. Selskab Mat. fys. Medde. 36, 5 (1967)), is obtained as follows: 71.0 g of chlorine (42.8 ml, measured at −80°, 1.00 mole) are introduced at 0° and within 30 minutes into a suspension of 96.1 g (1.00 mole) of furfural in 700 ml of water, while the whole is being well stirred.

The furfural goes into solution in the course of the reaction, and there is simultaneously formed a small amount (ca. 5 g) of an oily precipitate which is deposited on the walls of the reaction vessel. While stirring is maintained, 40 percent sodium hydroxide solution is thereupon added dropwise at 0° until a pH-value of 2 is obtained (ca. 200 g, 2.0 moles). The reaction mixture is decanted from the oily precipitate and diluted with water to 1000 ml. If the slightly yellow solution cannot be further processed immediately, it is cooled to ca. − 25°, at which temperature it can be stored without appreciable change.

EXAMPLE 2

To an opaque solution containing the dimethyl acetal of the cis-oxoglutaconaldehyde, and which has been produced as described below, are added all at once 3.12 kg (30.0 moles) of industrial sodium hydrogen sulphite. The mixture, which initially has a pH-value of 3.5, is stirred for 3 hours at 28° to 31°. The opaque solution, the pH-value of which has fallen to 2.2, is refluxed to 80° during a period of 1 hour, and is maintained for a further hour at this temperature. Crystals of a sequihydrate of the sodium salt of 5-formyl-furan-2-sulphonic acid commence to precipitate shortly before the mixture has attained a temperature of 80°. The thick suspension is cooled to 20° and the crystals are separated by centrifuging. The separated precipitate is washed with 50 percent aqueous ethanol until the washing solution exhibits no further chloride reaction with silver nitrate; about 3 – 5 liters of washing liquid are required for this purpose.

The precipitate is afterwards washed with 1 liter of 96 percent ethanol and dried at 120° until the weight remains constant. The drying takes about 2 hours and is best carried out in a circulation drying cupboard. The yield amounts to 3.3 kg (55 percent of the theoretical value) of the sodium salt of 5-formyl-furan-2-sulphonic acid. The obtained product consists of slightly yellowish crystals which are slightly hygroscopic. The crystals have a purity of 99 percent.

Instead of sodium hydrogen sulphite, it is possible to use the equivalent amount of potassium hydrogen sulphite to produce the corresponding potassium salt.

The opaque starting solution containing the dimethyl acetal of the cis-oxoglutaconaldehyde is produced as follows:

Freshly distilled industrial furfural (2.88 kg, 30.0 moles) is mixed with 6.0 liters of industrial methanol in a 25 liter reaction flask. Into the solution are then introduced at 25°, through a glass tube ending in a 2 mm aperture, 2.13 kg (30.0 moles) of chlorine over a period of 5 hours. During the introduction of chlorine, the reaction mixture is maintained at a pH-value of 2.0 and is vigorously stirred. The pH-value is automatically kept at 2.0 by the addition of 5.5 kg (55 moles) of 40 percent sodium hydroxide solution. About 7.5 liters o-water are added to the thick white suspension, whereby of formed sodium chloride goes into solution.

EXAMPLE 3

Use of 5-formyl-furan-2-sulphonic acid for the production of a dyestuff.

23.2 parts of 2-hydrazino-5-sulphobenzoic acid are suspended in 100 ml of water at 20° to 25° and brought into solution at a pH-value of 6.5 - 7 by the addition of an aqueous sodium hydroxide solution. After the pH-value has been adjusted to 5.5 with an 80 percent acetic acid solution, 17.6 parts of 5-formyl-furan-2-sulphonic acid are then added within the course of 10 minutes. After stirring has proceeded for 20 minutes at room temperature, 20 parts of sodium hydrogen carbonate and the aqueous diazo suspension (obtained by diazotization of 24.6 parts of 6-acetylamino-2-aminophenol-4-sulphonic acid) are successively added to the solution. Over a period of 15 minutes at 10° to 15°, 100 ml of a 1N copper sulphate solution are then added dropwise; the solution is stirred for one hour at room temperature, heated to 60° and solid sodium hydroxide is added, so that a 6 percent solution is formed. This solution is maintained for 6 hours at 95° to 98°. After cooling, the formed dyestuff is isolated by acidification with 30 percent hydrochloric acid, filtered off and well washed with acid aqueous sodium chloride solution.

The obtained dyestuff can be condensed in a known manner in an aqueous solution at a pH-value of 6 to 7, with 2,4,5,6-tetrachloropyrimidine, or with 2,4-dichloropyrimidine-5-carboxylic acid chloride. In this manner are obtained dyestuffs which dye cotton and regenerated cellulose, in the presence of acid-binding agents, in blue shades having fastness to light and to wet processing.

What we claim is:

1. Process for the production of alkali salts of 5-formyl-furan-2-sulphonic acid, comprising reacting cis-oxoglutaconaldehyde, monomethyl, monoethyl, mono-n-propyl, dimethyl, diethyl or di-n-propyl acetal thereof with an alkali metal hydrogen sulphite in an aqueous or an aqueous-alcoholic solution.

2. Process according to claim 1, wherein the reaction is performed at a temperature between 0° C and the boiling point of the solution.

3. Process according to claim 1, wherein the reaction temperature is firstly maintained between 0° C and 50° C during 5 minutes to 4 hours, and then raised to between 50° C and the boiling temperature.

4. Process according to claim 1, wherein the reaction is performed at a pH-value of between 0.5 and 5.0.

5. Process according to claim 1, wherein the alkali metal hydrogen sulphite and the cis-oxoglutaconaldehyde or its acetal as defined are employed, in a molar ratio of from 1:1 to 2:1.

6. Process according to claim 1, wherein the reaction is firstly performed at a pH-value of between 2.0 and 3.0 and at a temperature of between 0° C and 16° C for about 30 minutes, and subsequently at about 60° C for 60 minutes and at a pH-value of between 2.0 and 1.0.

7. Process according to claim 1, wherein the reaction is firstly performed at a pH-value of 2.5 and at a temperature of 10° C for 30 minutes, and subsequently at a pH-value of 1.5 and at a temperature of 60° C for 60 minutes.

8. Process according to claim 1, wherein cis-oxoglutaconaldehyde or a dimethyl acetal thereof is reacted with an alkali metal hydrogen sulphite in an aqueous or an aqueous-alcoholic solution.

* * * * *